Oct. 15, 1957
M. A. BENNE
2,809,849
FOLDING TRUCK STEP
Filed April 29, 1955
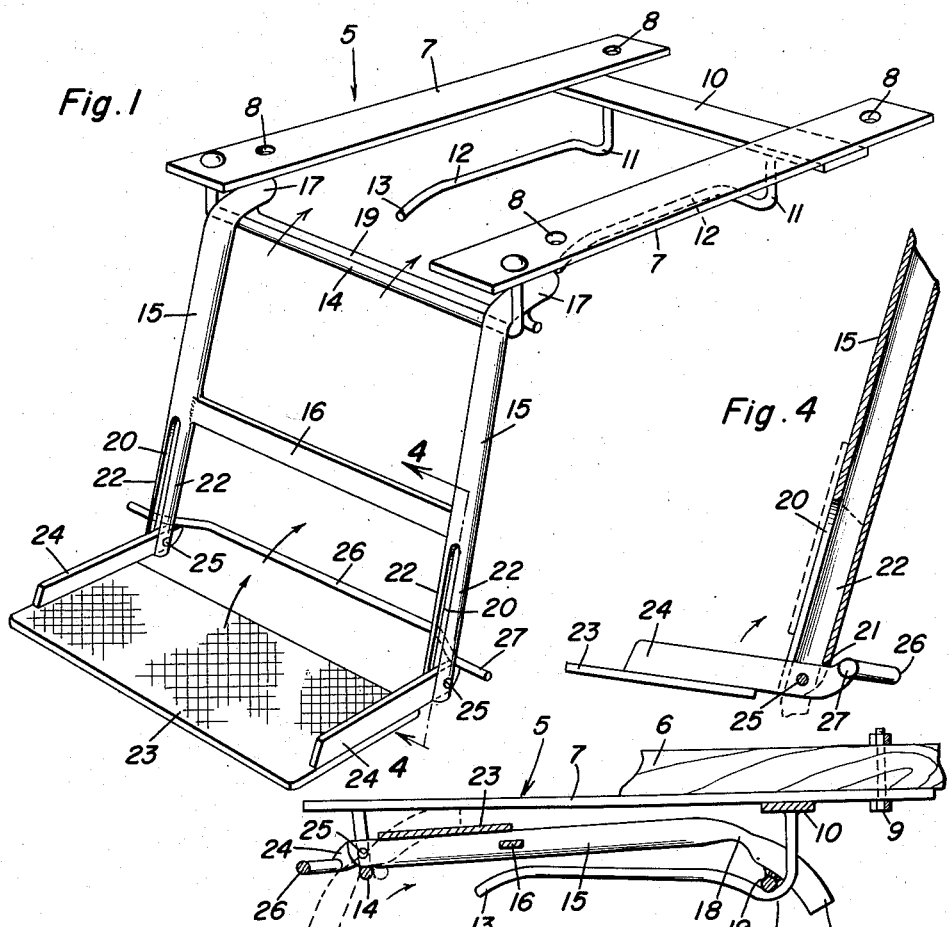
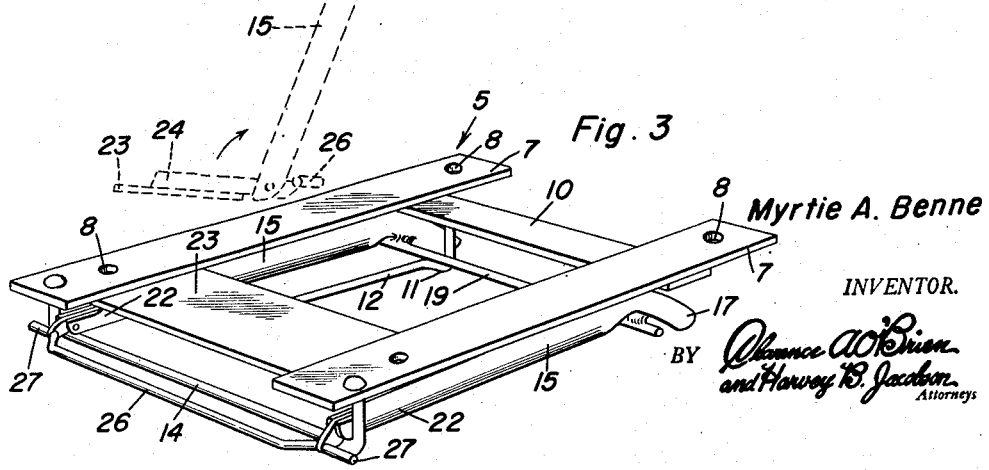
Myrtie A. Benne
INVENTOR.

United States Patent Office 2,809,849
Patented Oct. 15, 1957

2,809,849

FOLDING TRUCK STEP

Myrtie A. Benne, Crete, Nebr.

Application April 29, 1955, Serial No. 504,985

4 Claims. (Cl. 280—166)

The present invention relates to new and useful improvements in steps for various vehicles, particularly motor trucks and trailers, and has for its primary object to provide, in a manner as hereinafter set forth, a device of this character which, when it is not in use, may be expeditiously folded and stored in an out-of-the-way position beneath the bed of the vehicle.

Another important object of the invention is to provide a foldable, disappearing step of the aforementioned character which is adapted to be readily mounted for use on a vehicle without the necessity of making material structural alterations therein.

Other objects of the invention are to provide a vehicle step of the character described which will be comparatively simple in construction, strong, durable, compact, light in weight and which may be manufactured and installed at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a vehicle step constructed in accordance with the present invention, showing the device in unfolded or operative position;

Figure 2 is a view in vertical longitudinal section, showing the step in folded or inoperative position;

Figure 3 is a perspective view of the device in folded or inoperative position; and Figure 4 is a vertical sectional view, taken substantially on the line 4—4 of Figure 1.

Referring now to the drawing in detail, it will be seen that the embodiment of the invention which has been illustrated comprises a frame of suitable metal which is designated generally by reference character 5. The frame 5 is adapted to be mounted horizontally beneath the rear end portion of the body or bed of a vehicle, a portion which is indicated at 6 in Figure 2 of the drawing. Toward this end, the frame 5 includes a pair of spaced parallel longitudinal bars 7 the end portions of which are apertured as at 8, to accommodate bolts 9 for firmly securing said frame in position beneath the vehicle bed. The frame 5 further comprises a crossbar 10 extending between the rear end portions of the longitudinal bars 7.

Depending from the bar 10 is a pair of hooks 11 the purpose of which will be presently set forth. Formed integrally with the hooks 11 and projecting forwardly thereform is a pair of guide rods 12 which terminate in downwardly curved free or forward end portions 13. Depending from the forward end portions of the bars 7 of the frame 5 is a substantially U-shaped rod 14, the purpose of which will also be presently set forth.

Mounted on the frame 5 and slidable on the transverse rod 14 is a pair of spaced parallel arms 15 of suitable metal. A cross member or bar 16 rigidly connects the tubular arms 15 at an intermediate point. The arms 15 terminate in angularly extending or bent upper end portions 17 which are slidably engaged beneath the bars 7 of the frame 5. As best seen in Figure 2 of the drawing, the angles or bends of the arms 15 are provided in their lower portions with indentations or seats 18 for the reception of the rod 14 when said arms are in extended or operative position. Mounted beneath the rear end portions 17 of the arms 15 is a transverse rod 19 the end portions of which are engageable with the rod 14 to function as a stop for positively limiting the forward movement of said arms 15. The rod 19 also is slidable on the guides 12 and engageable in the hooks 11 for supporting the upper or rear end portions of the arms 15 when said arms are in retracted or inoperative position (see Figure 2).

The forward end portions of the tubular arms 15 have formed longitudinally therein diametrically opposite, relatively long and short slots 20 and 21, respectively, provided bifurcations 22. A folding step 23 is mounted for swinging movement on the arms 15. Toward this end, the step 23 has fixed on its end portions and projecting therefrom a pair of metallic bars 24. The projecting end portions of the bars 24 are journaled, as at 25, between the pairs of bifurcations 22 for operation in the slots 20 and 21. A handle 26 is affixed to the pivoted rear end portions of the bars 24, said handle terminating in projecting end portions 27.

It is thought that the use or operation of the device will be readily apparent from a consideration of the foregoing. Briefly, when the step is not in use the tubular arms 15 extend substantially longitudinally beneath the bars 7 of the supporting frame 5, the rod 19 resting in the hooks 11. The step 23 is in folded position on the arms 15, the slots 20 accommodating the bars 24. When the device is moved to folded or inoperative position the rod 19 travels on the guides 12 into the hooks 11. The projecting end portions 27 of the handle 26 function as stops engageable with the upstanding portions of the substantially U-shaped rod 14. When the device is to be used, the handle 26 is grasped and the arms 15 are pulled forwardly beneath the bars 7, said arms sliding across the rod 14, the rod 19 traveling on the guides 12 during the initial movement. However, as the arms 15 are pulled outwardly and the balance shifts forwardly of the rod 14, said arms fulcrum on said rod and the angularly bent upper end portions of said arms are engaged beneath the bars 7. The arms 15 are pulled forwardly until arrested by the engagement of the rod 19 with the rod 14, said rod 14 seating in the recesses 18. The arms 15 are then swung downwardly on the rod 14 until arrested and supported in an inclined position by the engagement of the rear end portions 17 of said arms beneath the bars 7. The step 23 is then swung forwardly and downwardly until arrested and supported in a substantially horizontal position by the engagement of the pivoted rear end portions of the bars 14 with the upper end walls of the relatively short slots 21, as seen in Figure 4 of the drawing. The device is now ready for use.

The foregoing is considered as illustrative only of the principles of the invention. Further, since numerous modifications and changes will readily occur to those skilled in the art it is not desired to limit the invention to the exact construction and operation shown and described, and accordingly all suitable modifications and equivalents may be resorted to, falling within the scope of the invention as claimed.

What is claimed as new is as follows:

1. A folding vehicle step of the character described comprising: a frame for mounting beneath the bed of a vehicle, a pair of upturned hooks depending from one end portion of said frame, a rod mounted transversely beneath the other end portion of said frame, a pair of arms mounted for sliding and swinging movement beneath the frame on said rod, a step pivotally mounted on one end portion of the arms, a rod on the other end portions of the arms engageable by gravity in said hooks for supporting and retaining said arms in inoperative position, and guides on the hooks engageable with the second named rod for directing same into said hooks.

2. A folding vehicle step of the character described comprising: a frame for mounting beneath the bed of a vehicle, said frame including a pair of spaced, parallel longitudinal bars and a crossbar extending between one end portion of said longitudinal bars, upturned supporting hooks depending from the crossbar, a substantially U-shaped transversely extending rod depending from the other end portions of the longitudinal bars, a pair of tubular arms mounted for sliding and swinging movement on the rod beneath the longitudinal bars, a step pivotally mounted for swinging movement on one end portion of said arms, the other end portions of said arms extending angularly and being slidably engageable beneath the longitudinal bars for supporting said arms in operative position on the rod, a rod extending between the angularly bent end portions of the arms and engageable with the first named rod for limiting the sliding movement of said arms toward operative position, the second named rod being engageable in the hooks for supporting said other end portions of the arms in retracted position, and guides on the hooks for directing the second named rod into said hooks.

3. A folding vehicle step of the character described comprising: a frame for mounting beneath the bed of a vehicle, a substantially U-shaped rod mounted transversely on said frame, a pair of tubular arms slidably and rockably mounted on said rod, said arms having relatively long and short longitudinal slots in one end portion thereof closed at one end and defining bifurcations, a foldable step comprising bars having one end portion pivotally secured between the bifurcations and operable in the slots, said bars being engageable with the closed ends of the short slots for supporting said step to unfolded position on said arms, and a transverse handle affixed to the pivoted end portions of the bars, said handle terminating in projecting end portions engageable with the rod for limiting the sliding movement of the arms in one direction thereon, said bars being engageable longitudinally in the tubular arms through the long slots when the step is in folded position on said arms.

4. A folding vehicle step of the character described comprising: a pair of tubular arms, means slidably and rockably supporting said arms on the vehicle, said arms having diametrically opposite, relatively long and short slots in one end portion thereof open at one end and closed at the other ends and defining pairs of bifurcations, a step, bars on the step having one end portion pivotally secured between the pairs of bifurcations and operable in the slots, said bars being engageable with the closed end walls of the relatively short slots for supporting the step in operative position and further being longitudinally engageable in the long slots when said step is in inoperative position.

References Cited in the file of this patent
UNITED STATES PATENTS

| | | |
|---|---|---|
| 1,363,396 | Cross | Dec. 28, 1920 |
| 2,218,060 | Watson | Oct. 15, 1940 |
| 2,621,846 | Knibbs | Dec. 16, 1952 |

FOREIGN PATENTS

| | | |
|---|---|---|
| 105,817 | Australia | Nov. 14, 1938 |